April 3, 1962   R. W. PARNELL   3,027,752
APPARATUS AND METHOD FOR ACIDIZING FORMATION SAMPLES
Filed Nov. 21, 1957   2 Sheets-Sheet 1
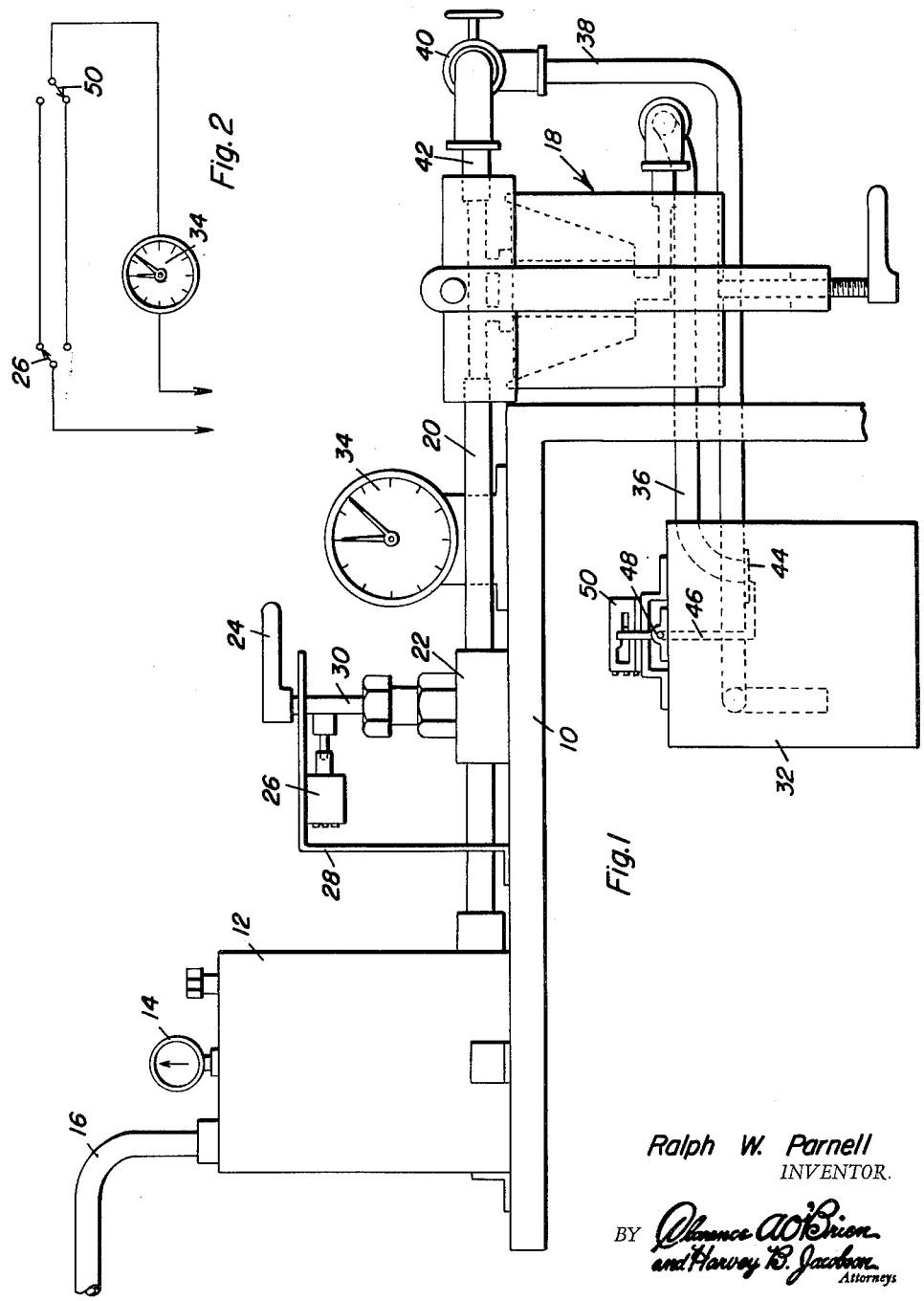
Ralph W. Parnell
INVENTOR.
BY *Clarence A. O'Brien*
*and Harvey B. Jacobson*
Attorneys April 3, 1962 R. W. PARNELL 3,027,752
APPARATUS AND METHOD FOR ACIDIZING FORMATION SAMPLES
Filed Nov. 21, 1957 2 Sheets-Sheet 2
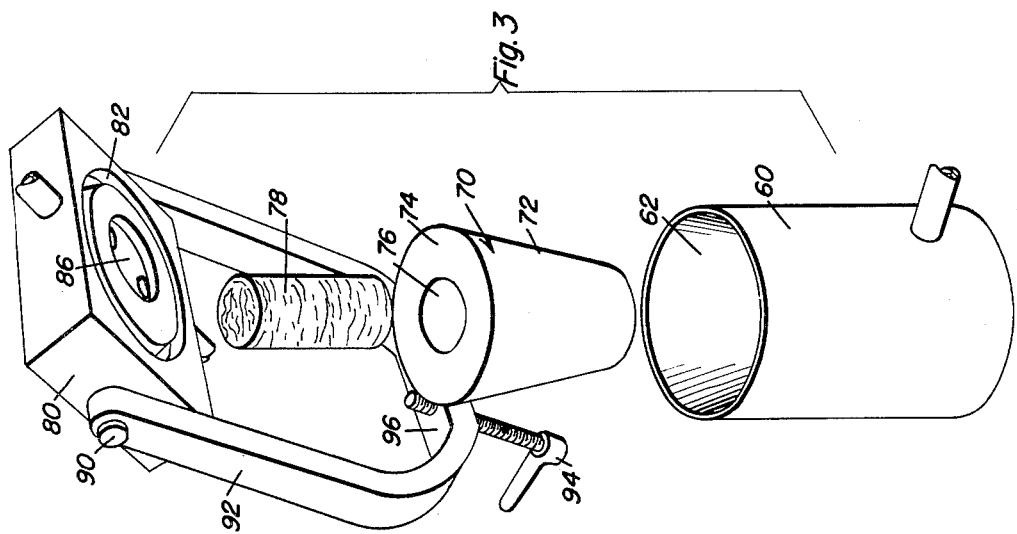
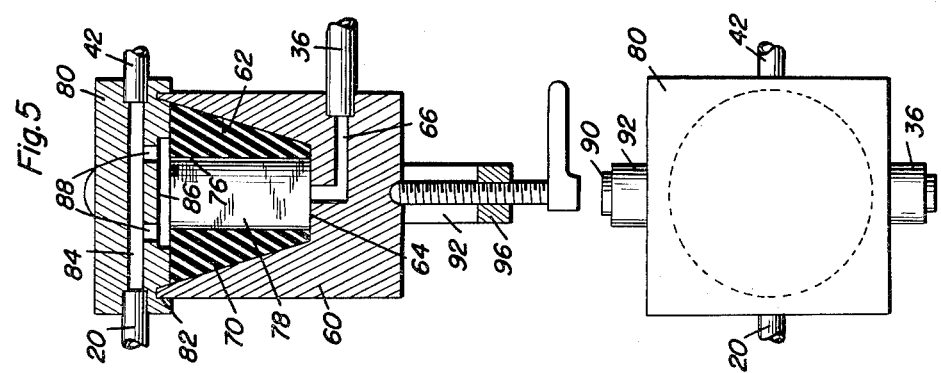
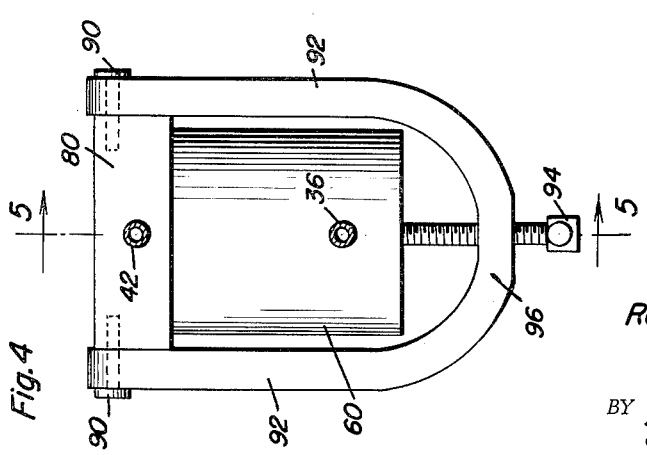
Ralph W. Parnell
INVENTOR.

United States Patent Office 3,027,752
Patented Apr. 3, 1962

3,027,752
APPARATUS AND METHOD FOR ACIDIZING FORMATION SAMPLES
Ralph W. Parnell, 631 Ricou-Brewster Bldg., Shreveport, La.
Filed Nov. 21, 1957, Ser. No. 697,979
6 Claims. (Cl. 73—38)

This invention comprises a novel and useful apparatus and method for acidizing formation samples and more particularly relates to a means and a method for testing core samples of oil bearing or other subterranean formations to determine their reaction to acidizing or other treatments in order that the formation from which the core samples are taken may be subsequently treated.

The primary purpose of this invention is to provide a method and apparatus for acidizing and fluid treating core samples and measuring the increased permeability and porosity of the samples after acid treatment has been applied thereto.

A further object of the invention is to provide an apparatus and a method which shall be equally effective for the treatment of core samples with acids or other fluids and for measuring the increased permeability and porosity effected by the acid treatment of the sample, and wherein core samples of any size, permeability or condition of fractures and fissures therein may be tested.

A further object of the invention is to provide an apparatus and a method which by testing the effects of acidizing and other fluid treatments upon core samples shall furnish a trustworthy indication of the manner in which the formation from which certain samples are taken may be expected to respond to similar treatments.

Yet another object of the invention is to provide an apparatus and method in which the acidizing and fluid treatment of samples shall be entirely automatic where desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view, parts of a support framework being broken away, of one suitable form of apparatus in accordance with and carrying out the method of this invention;

FIGURE 2 is a diagrammatic view of an electrical circuit of the apparatus of FIGURE 1;

FIGURE 3 is an exploded or group perspective view of the core sample holder and a core to be sealed therein for an acidizing testing treatment in accordance with this invention;

FIGURE 4 is a side elevational view of the core holder in the closed position of the same;

FIGURE 5 is a vertical transverse sectional view through the core holder taken substantially upon the plane indicated by section line 5—5 of FIGURE 4; and FIGURE 6 is a top plan view of the core holder of FIGURE 4.

Heretofore it has been common practice in the completing of an oil well in preparation for production therefrom; and in treating an oil well in order to increase the production therefrom or to restore a decreasing production, to apply acid to the face of the formation at the well bore in order to increase the porosity and permeability of the formation and thereby, by reducing resistance to flow of the fluid to be recovered from the formation, to increase the yield therefrom. However, the decision as to when and how to perform an acidizing treatment upon a formation has been determined by the individual knowledge and discretion of the individual driller or well operator. There has been no reliable means for obtaining in advance the knowledge as to how a particular formation will react to acidizing or other treatment both as to increase in permeability and porosity of the formation and as to the estimated increase in the fluids to be recovered from the formation.

It is therefore the purpose of this invention to provide apparatus and a method for testing core samples obtained from a particular formation in order to obtain both qualitative and quantative data on the effects, of acidizing wth respect to the permeability and porosity of the particular formation in question as a guide to determining the advisability of applying a similar acidizing treatment to the formation itself.

Briefly, the apparatus and method of this invention provides a means which will definitely determine whether a formation will take acid; the penetration rate and probable breakthrough time for acidizing various formations; the actual increase in the permeability and in the porosity of such a formation in response to acidizing; and some indication of the magnitude of the increased production which can be expected from the formation after such treatment.

A suitable form of testing apparatus in accordance with this invention has been illustrated in the accompanying drawings, this apparatus being capable of performing the method of testing comprising the subject matter of this invention. Referring first to FIGURE 1 it will be seen that the apparatus includes any suitable supporting framework 10 upon which is mounted a storage tank 12 containing acid or other liquid with which a sample is to be tested, this storage tank having a pressure gauge 14 connected therewith and a conduit 16 by which suitable pressure may be applied to the testing fluid within the tank 12.

Indicated generally by the numeral 18 is a testing chamber for receiving a core sample or other porous media for which the permeability and porosity are to be tested by the application of acid or other fluids thereto. A conduit 20 delivers the testing fluid from the container 12 under pressure to the testing chamber 18, a control valve designated generally by the numeral 22 being interposed in this conduit for controlling flow therethrough. This valve may be manually controlled as by handle 24, and is provided with an electric switch of any conventional design designated generally by the numeral 26 and which switch is adapted to be operated when the valve 24 is turned to the on position. The switch 26 may be carried by suitable bracket 28 and is operatively connected with the valve stem 30.

Indicated at 32 is a collection tank for collecting the fluid passing through the sample and any waste fluid therefrom.

An electrically operated treatment time duration clock 34 is electrically connected whereby to measure the time or duration of the application of the acid or other fluid treating means to the sample. As will be more readily apparent hereinafter, the acid under pressure, when the valve 24 is open is applied to the top of the sample in the core sample holder 18 when the acid or treating fluid finally passes entirely through the sample, it is collected at the bottom of the core holder and is delivered by the discharge conduit 36 into the collection tank 32. Additionally, there is provided a bleed conduit 38 provided with a control valve 40 and communicated by a fitting 42 with a core sample holder 18 above the core sample therein, whereby to permit a controlled flow of acid through the holder and across the top of the sample to thus insure the presence of a supply of fresh acid or treating medium to the core sample secured in the holder 18.

At its discharge end within the collector 32, the acid discharge conduit 36 is provided with a flow detecting closure member 44 so that the pressure or weight of the fluid discharge through the conduit 36 will force the closure 44 open, and since the latter is carried by a lever 46, pivoted as at 48, the upper end of this lever will actuate an electric switch 50.

The two switches form a part of an electric circuit for the time clock 34, it being now apparent that as shown by the diagrammatic view of FIGURE 2, that when the first switch 26 is closed by opening the manual control valve 22 by manipulating the handle 24, the circuit from any suitable electric source through the electric clock will be completed to thus start operation of the clock. After the acid or treating medium has passed through the core sample, and by means of the conduit 36 is discharged into the collection receptacle 32, it will open the closure 44, actuate the lever 46 and thus open the second switch 50. This will break the electric circuit through the clock and thus the clock will record the time during which the acidizing process continued from its start until its breakthrough of the sample.

Reference is now made particularly to FIGURES 3-6 for an understanding of the construction and operation of the core sample holder and the function of this part of the apparatus in the testing core samples.

As shown in these figures, the core sample retainer consists of a generally cylindrical outer casing 60 which is open at its upper end and has a conical downwardly convergent inner surface 62 terminating in a flat bottom wall 64. A passage 66 opens from the bottom wall to receive any acid or other treating medium which passes through the core sample during the testing of the same, this passage in turn communicating with the discharge conduit 36 previously mentioned. A core holder or sealing member in the form of a conical plug 70, and constructed of rubber or other suitable deformable resilient material, and which will resist the destructive effects of the acid or other fluid from which the core sample is to be tested, is provided having a conical exterior surface 72 which is complementary to the surface 62, and further has a flat annular top surface 74. An axial cylindrical bore 76 extends through this plug for the reception of a core sample 78. A closure is provided for the upper end of the member 60, this closure preferably comprising a block 80 having an annular groove 82 therein adapted to receive the upper edge of the body 60 whereby when the closure is pressed downwardly on the body, a seal will be established between the closure and body and the central portion of the closure will press and force the conical member 72 into tight sealing engagement with both the core sample 78 and the seating surface 62 of the body 60.

The closure is provided with a transverse bore or passage 84 therethrough with which the acid or fluid treating medium supplied conduit 20 and a bleed conduit 42 communicate.

The central portion of the inward or bottom surface of the closure is provided with a recess as at 86 which overlies the entire upper surface of the core sample 78, ports 88 establishing communication between the recess 86 and the passage 84.

The closure 80 is journaled as by trunnions 90 to the upper ends of the arms 92 of a yoke having a clamping screw 94 screw threadedly engaged through the bight or mid-portion 96 of the yoke. The arrangement is such that as will be seen by a comparison of FIGURES 3, 4 and 5, the clamping screw 94 may be caused to engage the bottom of the member 60 with the yoke 92 embracing the sides of the same, when the closure 80 is in seated engagement upon the upper end of the member 60. Upon tightening the screw the closure member will be forced downwardly, thus compressing the conical body 70 into tight sealing engagement with the core sample.

The operation of this testing apparatus and the method of testing in accordance with this invention which is performed by the apparatus, is as follows:

A core sample 78 is placed in cylindrical bore 76 provided in the core sealing body 70 and these members are then placed in the chamber in the body 60 in the manner shown in FIGURE 5. The cover 80 is then clamped in place tightly compressing and deforming the body 70 into a fluid tight sealing engagement with both the core sample 78 and the conical seating surface 62 and the bottom wall 64 of the body 60. The valve 24 is then opened which closes the switch 26 starting the operation of the time clock 34, and at the same time permitting the flow of acid or other treating fluid from the tank 12 under whatever pressure is applied by the conduit 16 into the passage 84, by means of the ports 88 and chamber 86 to the top surface of the core sample 78. At this time, it should be observed that the device permits the applying of any desired pressure to the treating medium and with the latter to the top of the core sample.

It will now be seen that the acid or treating fluid applied to the top surface of the sample 78 by the pressure imposed by the conduit 16 upon the tank 12 will gradually penetrate and work its way through the pore structure of the sample, eventually, after passing through this sample, being discharged by the passage 66 and conduit 36 into the collection tank 32. During its passage through the sample, the testing agent, if acid, will dissolve and enlarge the pore space and capillary passages of the sample thereby increasing the permeability and/or porosity of the same. If the treating fluid is salt water or other material it will presumably likewise force its way through the structure of the sample and eventually be discharged through the passage 66 and conduit 36.

In order to insure the presence of a fresh supply of acid or other treating fluid at the upper surface of the core sample at all times, the control valve 40 may be opened a sufficient amount to submit a slot passage of the treating fluid across the top of the sample by means of the passage 84 and into the container 32.

When the treating fluid finally works it way through the same it will collect in the conduit 36 until a sufficient pressure is built up therein, either by its own weight or by a portion of the pressure from the tank 12 passing through the core sample, to open the closure 44. The opening of the closure in turn through the lever 46 operates the switch 50 thus opening the electric circuit of the time clock 34 and accurately indicating the length of time during which the sample was subjected to the treating fluid. The control valve 24 may then be closed, and upon opening the discharge valve 40, the pressure in the conduit 20 and applied to the top of the sample may be vented and the sample may then be removed.

After the sample is removed, it is then dried preferably in an electric oven and the porosity and permeability of the sample and the increase of the same as a result of the treatment applied thereto is measured. This data affords a definite indication as to the effects which can be obtained by corresponding treatment of the formation from which the sample was taken, and thus enables the well driller or operator to determine the desirability and effectiveness of such treatment in advance of the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of testing core samples and obtaining data to determine response to acidizing comprising; supplying acid under adjustable pressure; selectively admitting said acid under pressure to one face of a core sample; initiating time measurement in response to said admission of acid; maintaining said pressure upon the acid until the latter passes through the sample; terminating time measurement in response to passage of acid through said sample; said timing measurement including the starting of a timing device when the acid is applied to the face of the sample and using the acid which passes through the sample to stop operation of the timing device; and further including the step of causing a constant flow of acid across the face of the sample while maintaining the pressure thereon whereby to insure a supply of fresh acid in contact with the sample face.

2. An apparatus for testing the effects of acidizing upon the porosity and permeability of a core sample comprising, a testing receptacle, means for sealing a core sample in said receptacle with only one face thereof exposed to a testing acid, selectively adjustable means for applying a testing acid under adjustable pressure to said face, means for collecting said acid passing through said sample from said face, flow responsive means for measuring time of acid flow through said sample, and means for bleeding acid applied to said face to maintain acid flow, whereby to ensure contact of fresh acid with said face.

3. The combination of claim 2 wherein said time measuring means includes a valve controlling flow of acid to said testing receptacle, an electric timer including an electric circuit, a first switch operably connected to said valve for initiating operation of said timer when said valve is open, a second switch operably connected to said circuit and operable upon emergence of said acid from said sample after passage therethrough to stop operation of said timer.

4. The combination of claim 2 wherein said testing receptacle comprises a testing chamber and a closure, a deformable sealing plug having a passage therethrough for receiving a core sample therein, said plug having engagement with the sides and bottom of said testing chamber, said closure having engagement with the top of said plug, means for clamping said closure on said receptacle and plug and causing the closure to force the plug into fluid tight sealing engagement with the core sample and the walls of said testing chamber, said acid applying means including a passage in said closure communicating with a source of acid under pressure, ports communicating with said passage and with the face of said core sample.

5. An apparatus for testing the effects of acidizing upon the porosity and permeability of a core sample comprising, a testing receptacle, means for sealing a core sample in said receptacle with only one face thereof exposed to a testing acid, selectively adjustable means for applying a testing acid under adjustable pressure to said face, means for collecting acid passing through said sample from said face, flow responsive means for measuring time of acid flow through said sample, said acid testing receptacle comprising, a testing chamber and a closure, a deformable sealing plug having a passage therethrough for receiving a core sample therein, said plug having engagement with the sides and bottom of said testing chamber, said closure having engagement with the top of said plug, means for clamping said closure on said receptacle and plug and causing the closure to force the plug into fluid tight sealing engagement with the core samples and the walls of said testing chamber, said acid applying means including a passage in said closure communicating with a source of acid under pressure, ports communicating with said passage and with the face of said core sample, and means communicating with said passage for bleeding acid therefrom whereby to maintain a supply of fresh acid in contact with said core sample.

6. An apparatus for testing and obtaining data on the effects of acidizing of a core sample comprising, selectively operable means for supplying acid under adjustable pressure, means for applying said acid to a top face of the core samples, means for collecting said acid passing through the core sample, flow varying means operatively connecting said top face to the acid collecting means for maintaining a constant flow of said acid across said top face, and duration timing means responsive to said selectively operable means and the reception of acid from the core sample within the collecting means for measuring the acid treatment time of the core sample under controlled and measured conditions.

References Cited in the file of this patent

UNITED STATES PATENTS

| | | |
|---|---|---|
| 1,371,565 | MacInnes | Mar. 15, 1921 |
| 2,174,053 | Clarke | Sept. 26, 1939 |
| 2,631,242 | Metcalf | Mar. 10, 1953 |
| 2,633,015 | Morris | Mar. 31, 1953 |
| 2,659,433 | Brown | Nov. 17, 1953 |
| 2,733,595 | Twining | Feb. 7, 1956 |
| 2,739,476 | Atkins | Mar. 27, 1956 |

OTHER REFERENCES

Publication: Chamberlain, "Acidizing Core Samples to Guide Effective Treatment—Formations," Oil Weekly, February 28, 1938, pages 20, 22, 26, 27, 28, 30, 32 and 34. (Copy in Scientific Library.)